(12) United States Patent
Xu et al.

(10) Patent No.: US 11,877,084 B2
(45) Date of Patent: Jan. 16, 2024

(54) VIDEO CONFERENCE USER INTERFACE LAYOUT BASED ON FACE DETECTION

(71) Applicant: Hewlett-Packard Development Company, L.P., Spring, TX (US)

(72) Inventors: Hai Xu, Beijing (CN); Xi Lu, Beijing (CN); Yongkang Fan, Beijing (CN); Tiantian Pang, Beijing (CN); Matthew Xiang, Beijing (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 91 days.

(21) Appl. No.: 17/600,065

(22) PCT Filed: Jun. 29, 2020

(86) PCT No.: PCT/CN2020/098721
§ 371 (c)(1),
(2) Date: Sep. 29, 2021

(87) PCT Pub. No.: WO2022/000158
PCT Pub. Date: Jan. 6, 2022

(65) Prior Publication Data
US 2022/0303478 A1 Sep. 22, 2022

(51) Int. Cl.
*H04L 65/403* (2022.01)
*H04N 5/262* (2006.01)
*G06V 40/16* (2022.01)

(52) U.S. Cl.
CPC ......... *H04N 5/2628* (2013.01); *G06V 40/161* (2022.01); *H04L 65/403* (2013.01); *H04N 5/2624* (2013.01)

(58) Field of Classification Search
CPC .. G06F 3/04845; G06V 40/161; G06V 40/16; G06V 20/40; H04N 7/147; H04N 5/2628;
(Continued)

(56) References Cited

U.S. PATENT DOCUMENTS

| 7,554,571 | B1 * | 6/2009 | Beck ..................... H04N 7/152 |
| | | | 348/14.09 |
| 2010/0333004 | A1 * | 12/2010 | Kristiansen ............ H04N 7/142 |
| | | | 715/765 |

(Continued)

FOREIGN PATENT DOCUMENTS

| CN | 104169842 A | 11/2014 | |
| CN | 106210855 A | * 12/2016 | ......... G06K 9/00221 |

(Continued)

OTHER PUBLICATIONS

Written Opinion of the International Searching Authority issued in corresponding international application No. PCT/CN2020/098721 dated Mar. 29, 2021 (4 pages).

(Continued)

*Primary Examiner* — Melur Ramakrishnaiah
(74) *Attorney, Agent, or Firm* — Quarles & Brady LLP (57) ABSTRACT

A method may include obtaining a frame of a video stream of multiple video streams of a video conference, obtaining face detection information identifying a face size and a face position of at least one face detected in the frame, and cropping and scaling the frame according to at least one crop and scale parameter using the face detection information to obtain a modified first frame. The at least one crop and scale parameter is based on frames of the multiple video streams. The frames include the frame. The method may further include presenting the modified frame.

18 Claims, 11 Drawing Sheets

(58) Field of Classification Search
CPC . H04N 5/2624; H04N 21/4312; H04L 65/403
USPC .......................................... 348/14.01–14.16
See application file for complete search history.

(56) References Cited

U.S. PATENT DOCUMENTS

| | | | |
|---|---|---|---|
| 2016/0227163 A1 | 8/2016 | Aarrestad et al. | |
| 2016/0308920 A1* | 10/2016 | Brunsch | H04L 67/141 |
| 2017/0094222 A1* | 3/2017 | Tangeland | H04N 23/51 |
| 2019/0215464 A1* | 7/2019 | Kumar | H04N 7/08 |

FOREIGN PATENT DOCUMENTS

| | | | | |
|---|---|---|---|---|
| CN | 106210855 A | 12/2016 | | |
| CN | 108270989 A | 7/2018 | | |
| WO | WO-2019156480 A1 * | 8/2019 | | G06K 9/00221 |

OTHER PUBLICATIONS

International Search Report issued in corresponding international application No. PCT/CN2020/098721 dated Mar. 29, 2021 (4 pages).

* cited by examiner

VIDEO CONFERENCE USER INTERFACE LAYOUT BASED ON FACE DETECTION

BACKGROUND

Videoconferences may have attendees from multiple sites. For example, a video relay service may accommodate sixteen or more different video streams. Conventional user interface layouts are based on sending frames from the different video streams to a receiving endpoint, where the receiving endpoint displays each frame directly. However, the sending endpoints and/or the receiving endpoint may use different aspect ratios, resulting in an inconsistent user interface layout. For example, the user interface layout may include black areas above and below video frames when the aspect ratios are different. In addition, conventional systems display video frames from different sending endpoints with the same size, even though some frames may include a single participant (e.g., on a mobile device) while other frames may include several people in a meeting room. For example, the active talker in the videoconference may be displayed in a large frame, while the remaining frames may be displayed in smaller frames with the same display size, regardless of the number of people in the frame. Furthermore, an attendee (e.g., on a mobile device) may be close to or distant from the camera, in which case the displayed video frame may display a big head or a small head, again resulting in an inconsistent user interface layout.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining a frame of a video stream of multiple video streams of a video conference, obtaining face detection information identifying a face size and a face position of at least one face detected in the frame, and cropping and scaling the frame according to at least one crop and scale parameter using the face detection information to obtain a modified first frame. The at least one crop and scale parameter is based on frames of the multiple video streams. The frames include the frame. The method further includes presenting the modified frame.

In general, in one aspect, one or more embodiments relate to a system including a camera and a video module. The video module is configured to obtain a frame of a video stream of multiple video streams of a video conference, obtain face detection information identifying a face size and a face position of at least one face detected in the frame, and crop and scale the frame according to at least one crop and scale parameter using the face detection information to obtain a modified first frame. The at least one crop and scale parameter is based on frames of the multiple video streams. The frames include the frame. The video module is further configured to present the modified frame.

In general, in one aspect, one or more embodiments relate to a non-transitory computer readable medium including instructions that, when executed by a computer processor, perform obtaining a frame of a video stream of multiple video streams of a video conference, obtaining face detection information identifying a face size and a face position of at least one face detected in the frame, and cropping and scaling the frame according to at least one crop and scale parameter using the face detection information to obtain a modified first frame. The at least one crop and scale parameter is based on frames of the multiple video streams. The frames include the frame. The instructions further perform presenting the modified frame.

Other aspects of the invention will be apparent from the following description and the appended claims.

BRIEF DESCRIPTION OF DRAWINGS

FIG. 2, FIG. 3.1, FIG. 3.2, FIG. 3.3, and FIG. 3.4 show components of the operational environment of FIG. 1.

FIG. 4.1 and FIG. 4.2 show flowcharts of methods in accordance with one or more embodiments of the disclosure.

FIG. 5.1, FIG. 5.2, FIG. 5.3, and FIG. 5.4 show examples in accordance with one or more embodiments of the disclosure.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

In the drawings and the description of the drawings herein, certain terminology is used for convenience only and is not to be taken as limiting the embodiments of the present disclosure. In the drawings and the description below, like numerals indicate like elements throughout.

In general, one or more embodiments obtain face detection information from a frame of a video stream of a video conference that has multiple video streams. The face detection information identifies a face size and a face position of one or more faces detected in the frame. The frame is cropped and scaled according to one or more crop and scale parameters using the face detection information to obtain a modified frame. The crop and scale parameter(s) may be based on the frames of the multiple video streams. Example crop and scale parameter(s) identify a target frame region enclosing the portion of the frame to be included in the modified frame. The crop and scale parameter(s) may further identify a target face region enclosing a face in the frame. The target frame region and the target face region may be defined relative to a template that indicates the proportion of the size of the target frame region relative to the size of the target face region.

A receiving endpoint may arrange frames received from multiple sending endpoints in a user interface layout that includes a frame size for each frame based on the number of faces in each frame and/or the number of frames received from different video streams. The receiving endpoint may select the layout based on a layout rule. For example, a layout rule corresponding to a "person-to-person layout" may specify that each frame contain exactly one face, and that the number of frames received is two. As another example, a layout rule corresponding to an "active speaker layout" may specify that the number of frames received is at least three.

Disclosed are systems and methods for generating a video conference user interface layout. While the disclosed systems and methods are described in connection with a teleconference system, the disclosed systems and methods may be used in other contexts according to the disclosure.

Figure 1:
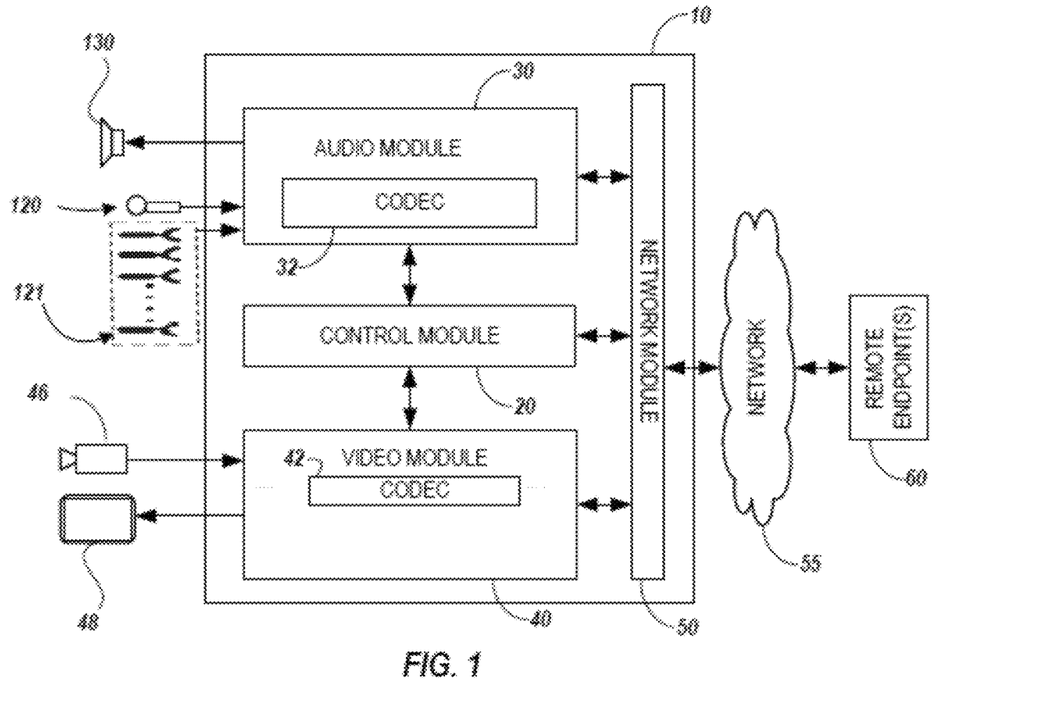
FIG. 1 shows an operational environment of embodiments of this disclosure.

FIG. 1 illustrates a possible operational environment for example circuits of this disclosure. Specifically, FIG. 1 illustrates a conferencing apparatus or endpoint (10) in accordance with an embodiment of this disclosure. The conferencing apparatus or endpoint (10) of FIG. 1 communicates with one or more remote endpoints (60) over a network (55). The endpoint (10) includes an audio module (30) with an audio codec (32), and a video module (40) with a video codec (42). These modules (30, 40) operatively couple to a control module (20) and a network module (50). The modules (30, 40, 20, 50) include dedicated hardware, software executed by one or more hardware processors, or a combination thereof. In some examples, the video module (40) corresponds to a graphics processing unit (GPU), a neural processing unit (NPU), software executable by the graphics processing unit, a central processing unit (CPU), software executable by the CPU, or a combination thereof. In some examples, the control module (20) includes a CPU, software executable by the CPU, or a combination thereof. In some examples, the network module (50) includes one or more network interface devices, a CPU, software executable by the CPU, or a combination thereof. In some examples, the audio module (30) includes, a CPU, software executable by the CPU, a sound card, or a combination thereof.

In general, the endpoint (10) can be a conferencing device, a videoconferencing device, a personal computer with audio or video conferencing abilities, a mobile computing device, or any similar type of communication device. The endpoint (10) is configured to generate near-end audio and video and to receive far-end audio and video from the remote endpoints (60). The endpoint (10) is configured to transmit the near-end audio and video to the remote endpoints (60) and to initiate local presentation of the far-end audio and video.

A microphone (120) captures audio and provides the audio to the audio module (30) and codec (32) for processing. The microphone (120) can be a table or ceiling microphone, a part of a microphone pod, an integral microphone to the endpoint, or the like. Additional microphones (121) can also be provided. Throughout this disclosure, all descriptions relating to the microphone (120) apply to any additional microphones (121), unless otherwise indicated. The endpoint (10) uses the audio captured with the microphone (120) primarily for the near-end audio. A camera (46) captures video and provides the captured video to the video module (40) and video codec (42) for processing to generate the near-end video. For each video frame of near-end video captured by the camera (46), the control module (20) selects a view region, and the control module (20) or the video module (40) crops the video frame to the view region. In general, a video frame (i.e., frame) is a single still image in a video feed, that together with the other video frames form the video feed. The view region may be selected based on the near-end audio generated by the microphone (120) and the additional microphones (121), other sensor data, or a combination thereof. For example, the control module (20) may select an area of the video frame depicting a participant who is currently speaking as the view region. As another example, the control module (20) may select the entire video frame as the view region in response to determining that no one has spoken for a period of time. Thus, the control module (20) selects view regions based on a context of a communication session.

After capturing audio and video, the endpoint (10) encodes it using any of the common encoding standards, such as MPEG-1, MPEG-2, MPEG-4, H.261, H.263 and H.264. Then, the network module (50) outputs the encoded audio and video to the remote endpoints (60) via the network (55) using any appropriate protocol. Similarly, the network module (50) receives conference audio and video via the network (55) from the remote endpoints (60) and sends the audio and video to respective codecs (32, 42) for processing. Eventually, a loudspeaker (130) outputs conference audio (received from a remote endpoint), and a display (48) can output conference video.

Figure 41:
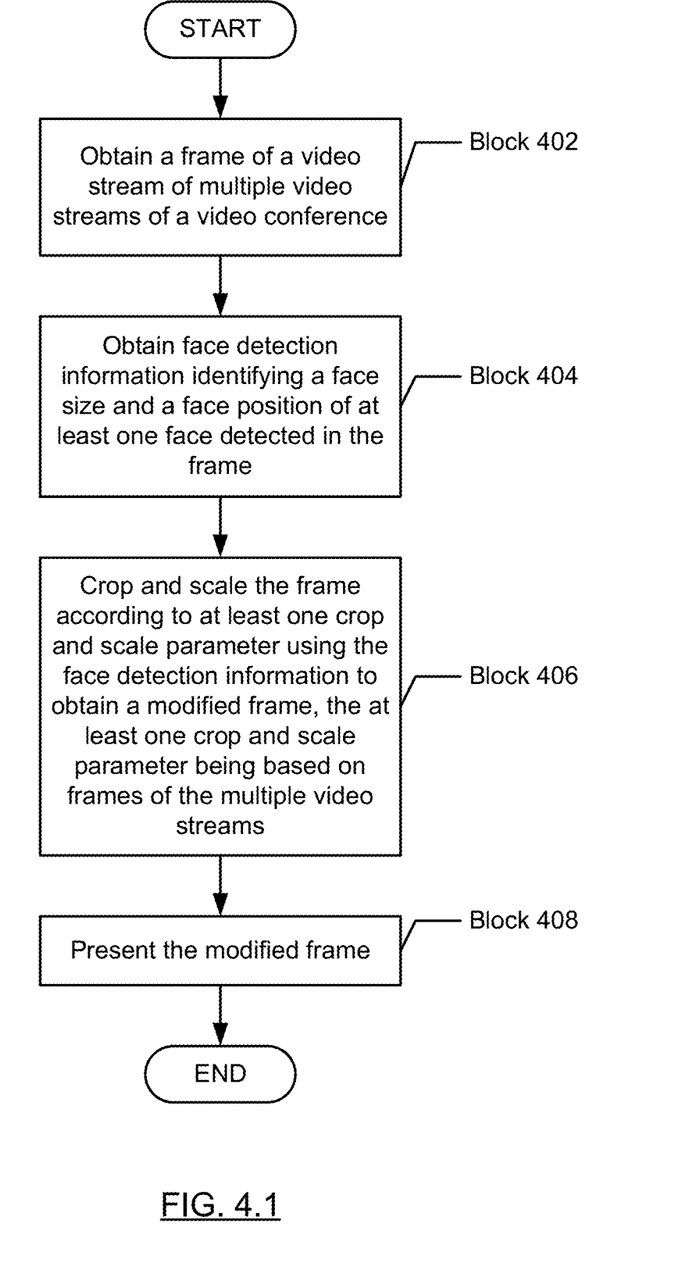
Figure 42:
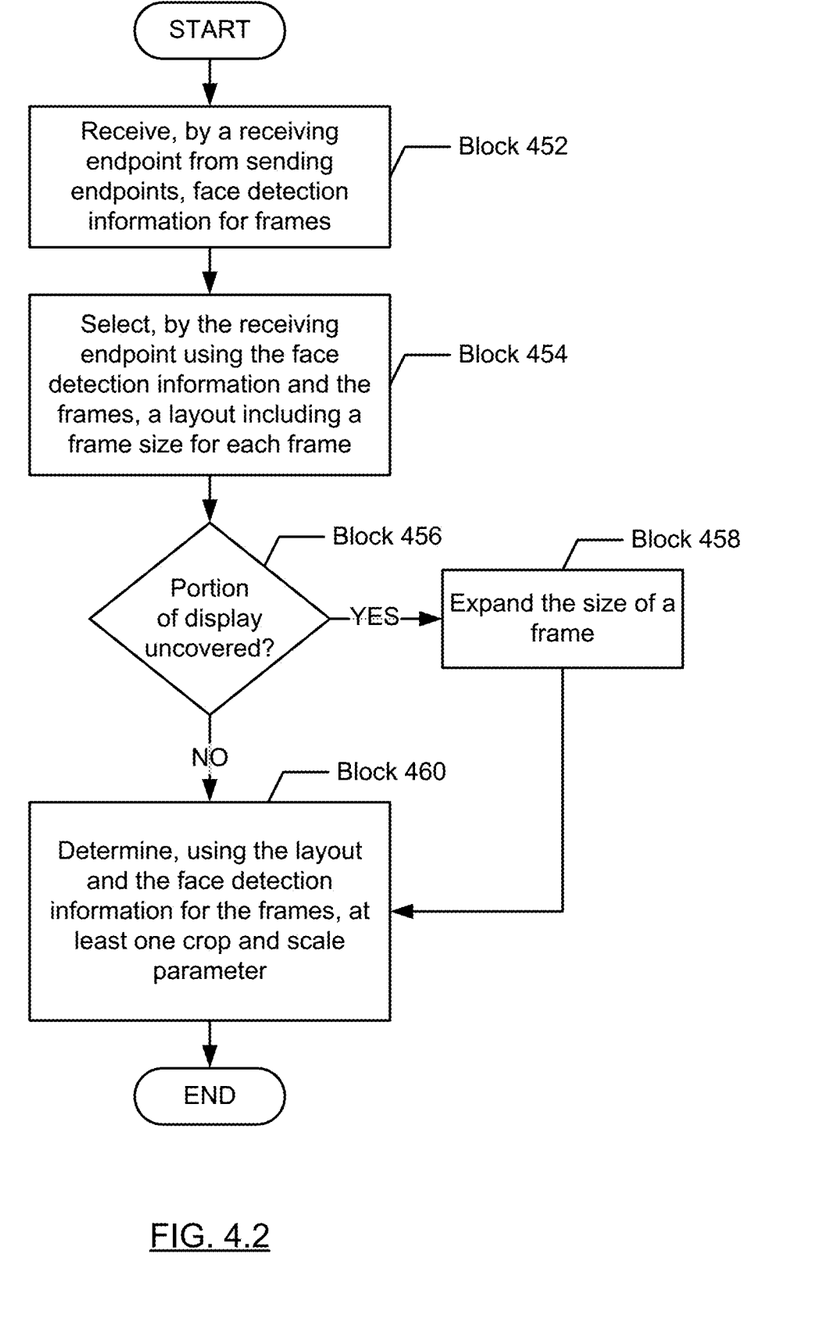

Thus, FIG. 1 illustrates an example of a device that generates a video conference user interface layout. In particular, the device of FIG. 1 may operate according to one or more of the methods described further below with reference to FIG. 4.1 and FIG. 4.2. As described below, these methods may assign the size of a video frame based on a number of faces detected in the video frame and the video frames of other video streams in the video conference.

Figure 2:
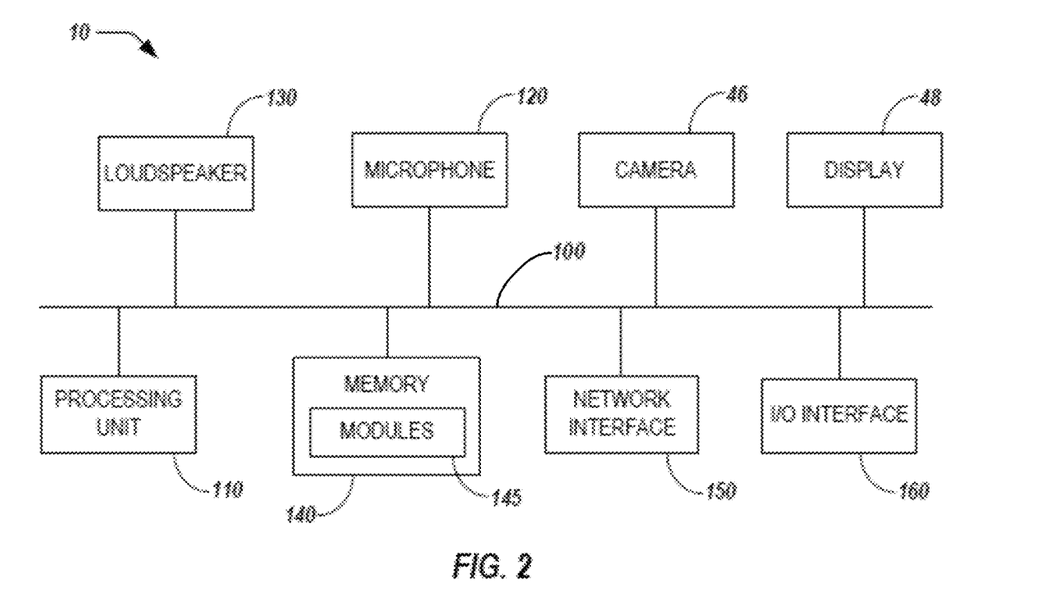

FIG. 2 illustrates components of the conferencing endpoint of FIG. 1 in detail. The endpoint (10) has a processing unit (110), memory (140), a network interface (150), and a general input/output (I/O) interface (160) coupled via a bus (100). As above, the endpoint (10) has the base microphone (120), loudspeaker (130), the camera (46), and the display (48).

The processing unit (110) includes a CPU, a GPU, an NPU, or a combination thereof. The memory (140) can be any conventional memory such as SDRAM and can store modules (145) in the form of software and firmware for controlling the endpoint (10). The stored modules (145) include the codec (32, 42) and software components of the other modules (20, 30, 40, 50) discussed previously. Moreover, the modules (145) can include operating systems, a graphical user interface (GUI) that enables users to control the endpoint (10), and other algorithms for processing audio/video signals.

The network interface (150) provides communications between the endpoint (10) and remote endpoints (60). By contrast, the general I/O interface (160) can provide data transmission with local devices such as a keyboard, mouse, printer, overhead projector, display, external loudspeakers, additional cameras, microphones, etc.

In relation to a particular video stream, an endpoint may be a sending endpoint or a receiving endpoint. The sending endpoint obtains the video stream locally and sends the video stream on the network to the receiving endpoint. The receiving endpoint receives the video stream that is sent from the sending endpoint via the network and presents the video stream locally (e.g., to a user or a user device). In a teleconference, the same endpoint may be a receiving endpoint and a sending endpoint with respect to different video streams. Further, for display of a local video stream, the endpoint may be both a sending endpoint and a receiving endpoint.

Figure 31:
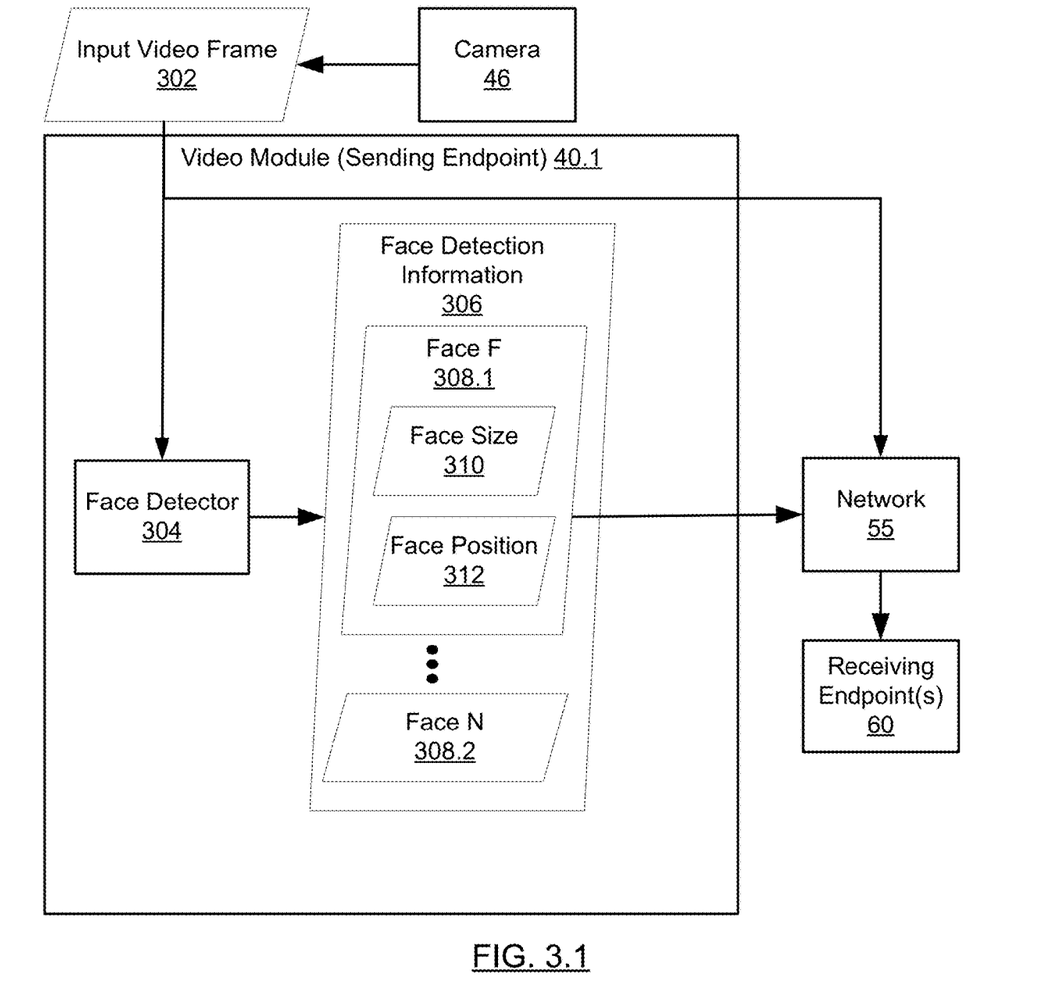

FIG. 3.1 shows a video module (40.1) of a sending endpoint (10). The sending endpoint (10) may include functionality to send an input video frame (302) to one or more receiving endpoints (60) (e.g., remote endpoints (60) of FIG. 1) via a network (55). In one or more embodiments, the sending endpoint (10) relays the input video frame (302) without encoding the input video frame (302). As shown in FIG. 3.1, the video module (40.1) includes functionality to receive an input video frame (302) from the camera (46). The input video frame (302) may be a video frame in a series of video frames captured from a video stream. For example, the video frame may include multiple individuals (e.g., in a meeting room that includes the endpoint (10)). Alternatively, the video frame may include a single individual (e.g., a user of a mobile device).

The video module (40.1) includes a face detector (304). The face detector (304) includes functionality to extract face detection information (306) from the input video frame (302). The face detection information (306) describes one or more regions in the input video frame (302) each including a face of an individual appearing in the input video frame (302). In one or more embodiments, the face detection information (306) includes a face size (310) and a face position (312) for one or more faces (308.1, 308.2) of one or more individuals appearing in the input video frame (302). The face size (310) may be represented using one or more size parameters. For example, the size parameters may be a height and a width of a bounding box for the face (308.1) or the foci of an ellipse (e.g., an oval) including the face (308.1). The face position (312) may be represented as a distance from a point of a display (e.g., display (48)). The point may be represented using Cartesian coordinates. For example, the point may be the top left corner of the display.

The video module (40.1) includes functionality to send the input video frame (302) and/or the face detection information (306) to one or more receiving endpoints (60) via the network (55).

Figure 32:
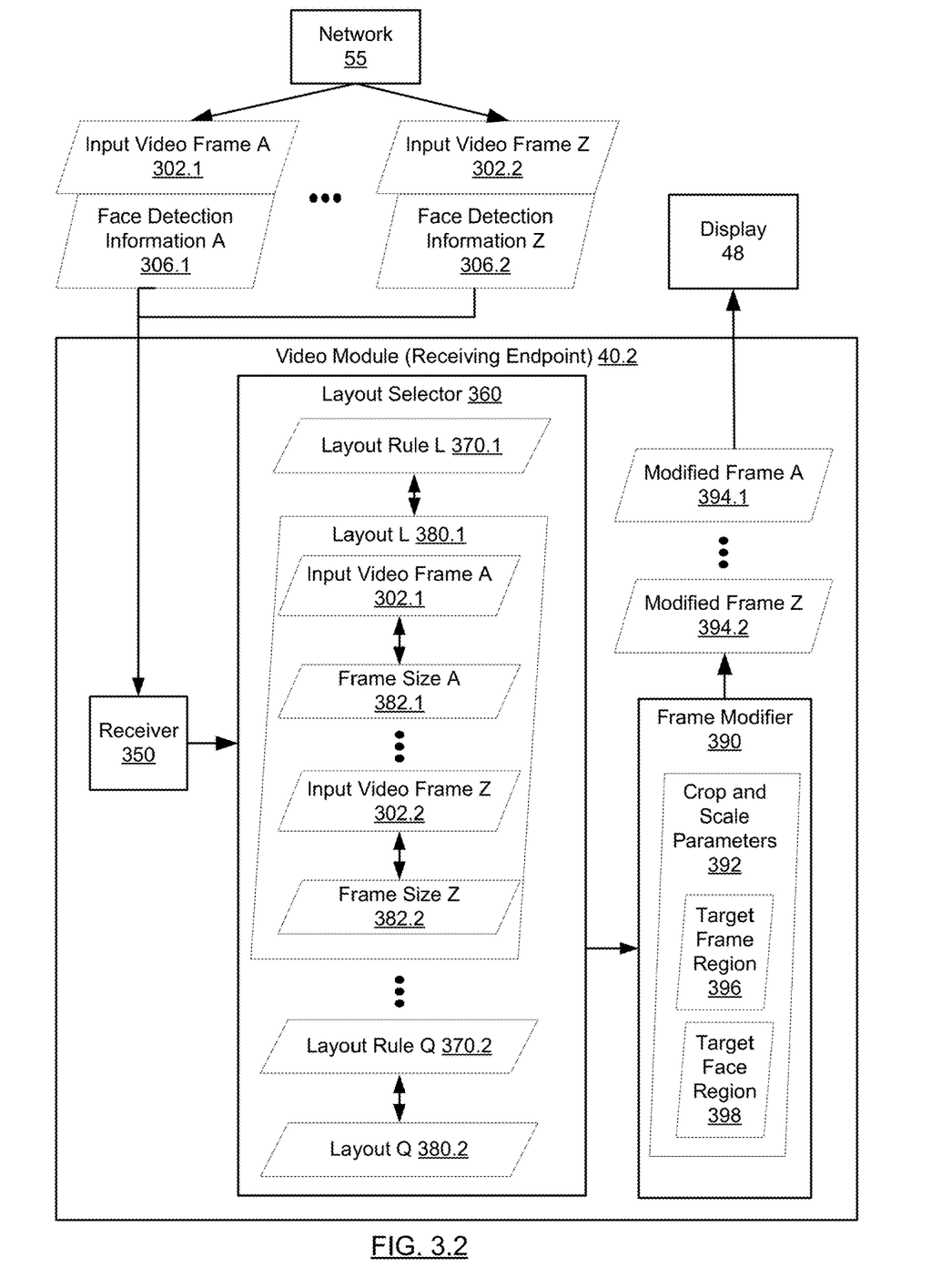
Figure 33:
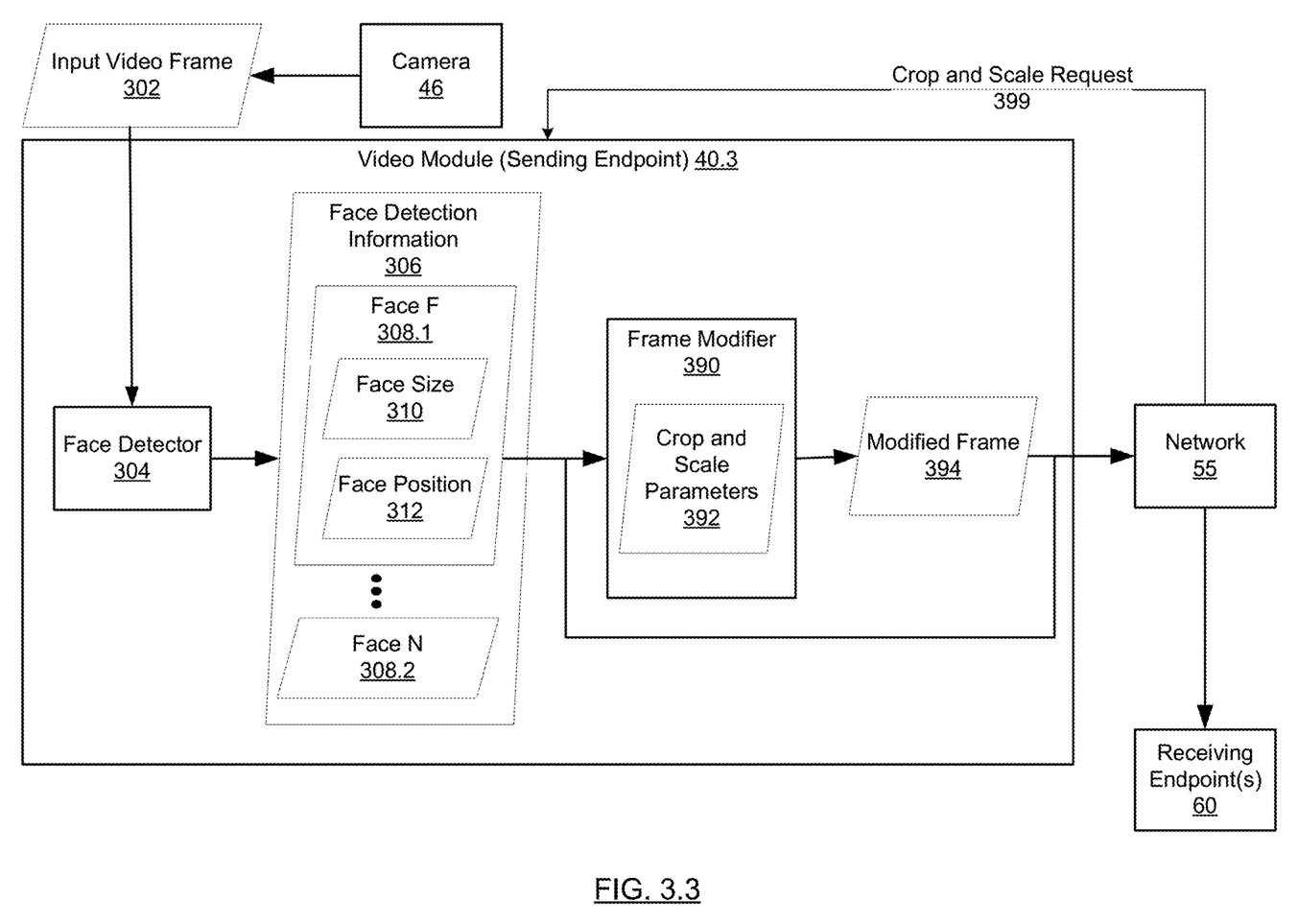

FIG. 3.2 shows a video module (40.2) of a receiving endpoint (60). The receiving endpoint (60) may include functionality to receive input video frames (302.1, 302.2) and face detection information (306.1, 306.2) from one or more sending endpoints (10) via the network (55). The video module (40.2) includes a receiver (350), a layout selector (360), and a frame modifier (390). The receiver (350) includes functionality to receive the input video frames (302.1, 302.2) and the face detection information (306.1, 306.2) from the sending endpoints (10) via the network (55). The receiver (350) includes functionality to send the input video frames (302.1, 302.2) and the face detection information (306.1, 306.2) to the layout selector (360).

The layout selector (360) includes layout rules (370.1, 370.2) and corresponding layouts (380.1, 380.2). Each layout (380.1) includes input video frames (302.1, 302.2) and corresponding frame sizes (382.1, 382.2). The frame sizes (382.1, 382.2) may be assigned by the layout rule (370.1) corresponding to the layout (380.1). For example, a layout rule (370.1) may assign a small frame size to an input video frame (302.1) when the number of faces (308.1, 308.2) in the face detection information (306.1) for the input video frame (302.1) is below a number of faces threshold. Continuing this example, the number of faces threshold may be three faces. Various numbers of faces may be used for the number of faces threshold and three is only an example. As another example, a layout rule (370.1) may assign a large frame size to an input video frame (302.1) when the number of faces (308.1, 308.2) in the face detection information (306.1) for the input video frame (302.1) is at least the threshold. Continuing this example, the large frame size may be a multiple of the small frame size (e.g., the large frame size may be double the small frame size). Each frame size (382.1, 382.2) may correspond to a specific aspect ratio.

The layout selector (360) includes functionality to select a layout (380.1) for the input video frames (302.1, 302.2) using layout rules (370.1, 370.2). The layout selector (360) may select a layout (380.1) matching a specific layout rule (370.1). For example, the selected layout may be based on the number of input video frames (302.1, 302.2) and/or the number of faces (308.1, 308.2) included in the face detection information (306.1, 306.2) for the input video frames (302.1, 302.2). One or more of the layout rules may have one or more frame thresholds for the number of frames. In the example, a layout rule corresponding to a "person-to-person layout" may specify that each of the input video frames contain exactly one face, and that the number of input video frames is two. As another example, a layout rule corresponding to an "active speaker layout" may specify that the number of input video frames is at least three, whereby three is a frame threshold.

Figure 51:
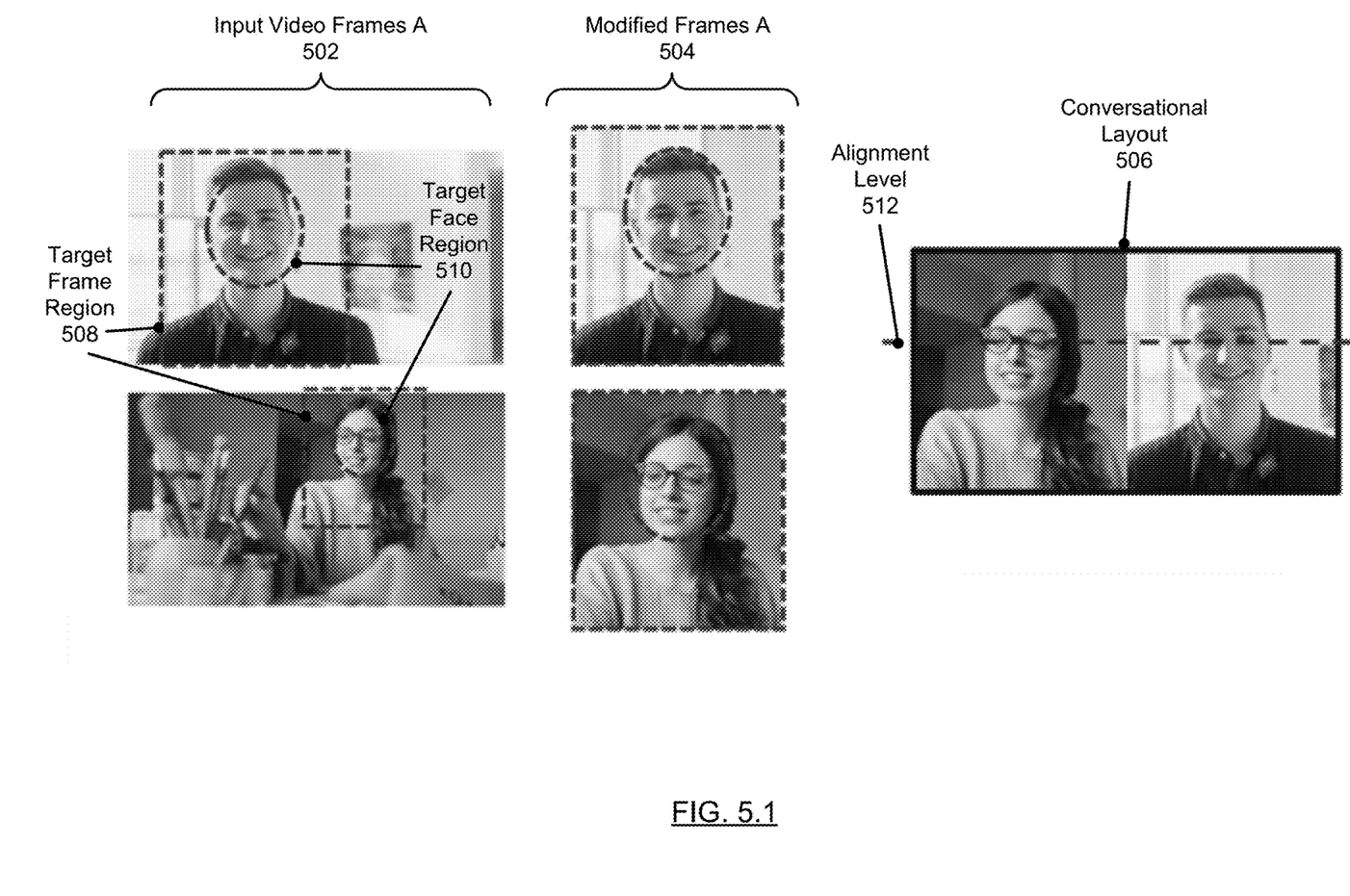

The frame modifier (390) includes functionality to generate one or more modified frames (394.1, 394.2) from one or more input video frames (302.1, 302.2) according to one or more crop and scale parameters (392). In one or more embodiments, the crop and scale parameters (392) include a target frame region (396) and a target face region (398). The target frame region (396) encloses the portion of an input video frame (302.1) to be included in the modified frame (394.1) generated from the input video frame (302.1). FIG. 5.1 shows an example of a target frame region (508) applied to different input video frames (502). The target face region (398) encloses a face of an input video frame (302.1). FIG. 5.1 further shows an example of a target face region (510) applied to different input video frames (502).

In one or more embodiments, the target frame region (396) and the target face region (398) are defined relative to a template that specifies the proportion of the target frame region (396) occupied by the target face region (398). The template may further specify the relative positions of the target frame region (396) and the target face region (398).

As shown in FIG. 3.2, the video module (40.2) may include functionality to present one or more modified frames (394.1, 394.2) to the display (48). For example, the video module (40.2) may transmit the modified frames (394.1, 394.2) to the display (48). As another example, the video module (40.2) may transmit the modified frames (394.1, 394.2) to a software application that sends the modified frames (394.1, 394.2) to the display (48).

Although FIGS. 3.1 and 3.2 show the sending endpoint and receiving endpoint as performing various functionality, an intermediate server in the network may perform at least some of the functionality described above. For example, a server may generate the modified frames (394.1, 394.2) from encoded input video frames received from one or more sending endpoints (10). The server may include functionality to decode the encoded input video frames (302.1, 302.2) in order to generate the modified frames (394.1, 394.2). The server may further include functionality to encode the modified frames (394.1, 394.2) and send the encoded modified frames to one or more receiving endpoints (60). Using a server has the advantage of centralizing the generation of modified frames (394.1, 394.2), although additional computational overhead may be incurred due to decoding and encoding frames.

FIG. 3.3 and FIG. 3.4 shows alternate embodiments of video module (40.1) of FIG. 3.1 and video module (40.2) of FIG. 3.2, respectively. In the configuration of FIGS. 3.3 and 3.4, the sending endpoint generates the modified frame. FIG. 3.3 shows a video module (40.3) of a sending endpoint (10). In contrast to video module (40.1) of FIG. 3.1, the video module (40.3) of FIG. 3.3 includes a frame modifier (390) that generates a modified frame (394). The video module (40.3) includes functionality to send the modified frame (394) to one or more receiving endpoints (60). Furthermore, the video module (40.3) includes functionality to receive a crop and scale request (399) from a receiving endpoint (60). The crop and scale request (399) may include one or more crop and scale parameters (392). For example, a crop and scale parameter (392) may be an aspect ratio or resolution to be used when generating the modified frame (394). Continuing this example, the crop and scale parameter (392) may be the aspect ratio of a display (48) of the receiving endpoint (60).

Figure 34:
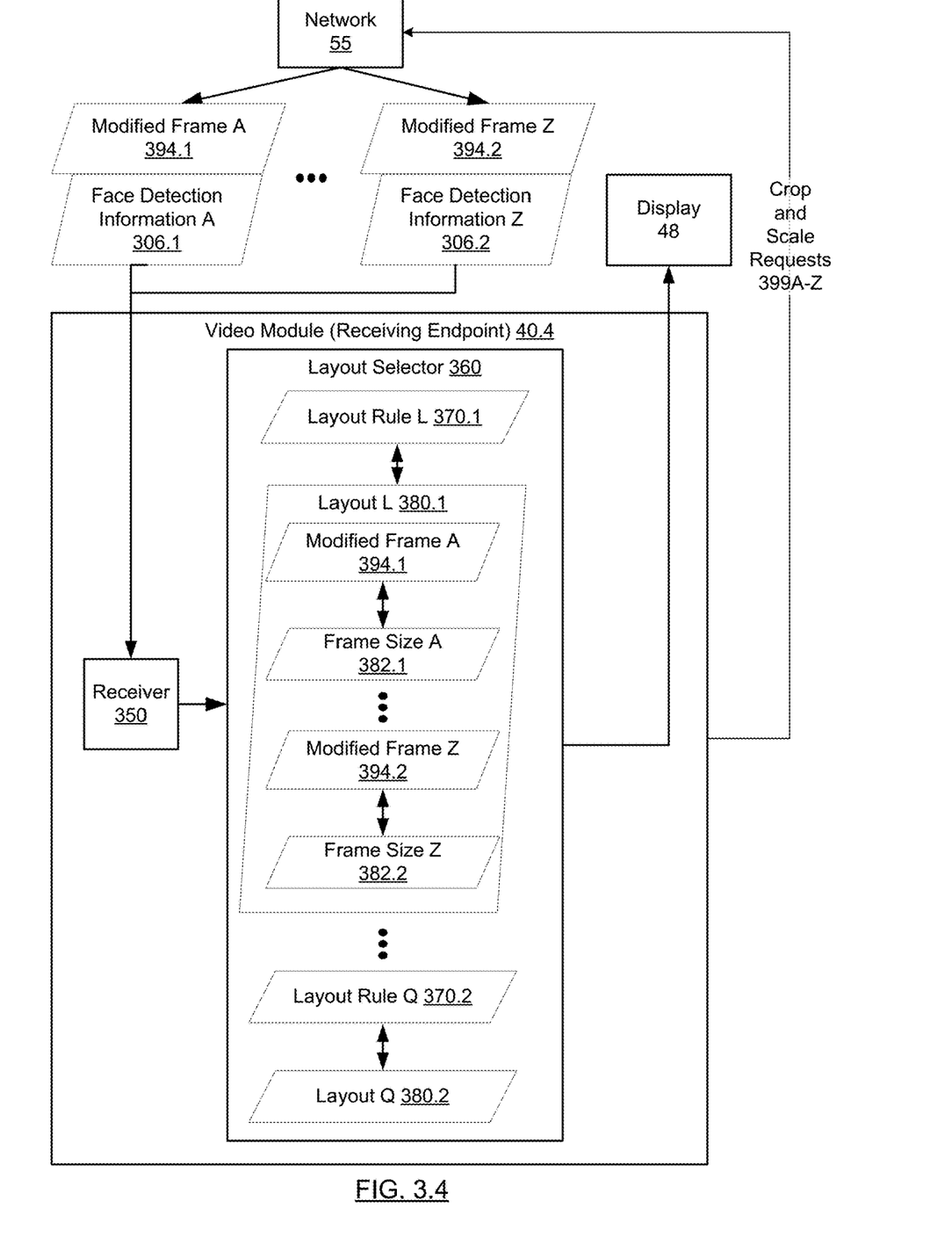

FIG. 3.4 shows a video module (40.4) of a receiving endpoint (60). In contrast to video module (40.2) of FIG. 3.2, the video module (40.4) of FIG. 3.4 does not include a frame modifier (390). The receiving endpoint (60) may include functionality to receive modified frames (394.1, 394.2) and face detection information (306.1, 306.2) from one or more sending endpoints (10) via the network (55). Furthermore, the video module (40.4) includes functionality to send crop and scale requests (399A-Z) to one or more sending endpoints (10) via the network (55). For example, the crop and scale requests (399A-Z) may include an aspect ratio to be used when the sending endpoints (10) generate the modified frames (394.1, 394.2) to be sent to the receiving endpoint (60).

FIG. 4.1 shows a flowchart in accordance with one or more embodiments of the invention. The flowchart depicts a process for generating a video conference user interface layout. One or more of the steps in FIG. 4.1 may be performed by the components (e.g., the video module (40.1, 40.3) of a sending endpoint (10) and the video module (40.2, 40.4) of the receiving endpoint (60)) discussed above in reference to FIG. 3.1, FIG. 3.2, FIG. 3.3, and FIG. 3.4. In one or more embodiments of the invention, one or more of the steps shown in FIG. 4.1 may be omitted, repeated, and/or performed in parallel, or in a different order than the order shown in FIG. 4.1. Accordingly, the scope of the invention should not be considered limited to the specific arrangement of steps shown in FIG. 4.1.

The steps of FIG. 4.1 may be performed by the sending endpoint, the receiving endpoint, a server, or any combination thereof.

Initially, in Block 402, a frame of a video stream of multiple video streams of a video conference is obtained. The video stream including the frame may be received from a local or remote camera. Obtaining the frame may include receiving a video stream with the frame from a local camera at the sending endpoint or receiving the video stream with the frame via a network.

In Block 404, face detection information identifying a face size and a face position of at least one face detected in the first frame is obtained. Obtaining the face detection information may be executing a face detection algorithm on the frame to detect the location of the face in the frame. The face detection information may be the output of the face detection algorithm or further processed output of the face detection algorithm. As another example, obtaining the face detection information may be obtaining the face detection information from a network, whereby another device performs the face detection algorithm. For example, if FIG. 4.1 is performed by the receiving endpoint, the receiving endpoint may obtain the face detection information by either executing the face detection algorithm on the frame or by receiving the face detection information as metadata with the frame from the sending endpoint or server. Various face detection algorithms may be used without departing from the scope of the claims. The face detection information describes one or more regions in the frame each including a face of an individual.

In Block 406, the frame is cropped and scaled according to at least one crop and scale parameter using the face detection information to obtain a modified frame. Applying the crop and scale parameter may be performed as follows. The face detection information may be used to identify a focus point of the video frame. For example, if a single person is detected, the focus point is the single person's face. If multiple people are detected, the focus point is the location of the multiple people. The frame is scaled to increase the size of the single person or multiple people's faces according to a scaling parameter (e.g., so that the size of the person(s) face matches the desired output size of a persons' face based on the layout). The frame is cropped based on the focus point of the frame to create a particular size of frame. The cropping and scaling may be performed at the same time, such as when the crop and scale parameter is a single parameter represented as a template. For example, a template may specify a size and location of a person's face and the size of the frame. Increasing the size of the frame based on the template, and cropping out the portion of the frame not in the template creates the modified frame.

The at least one crop and scale parameter may be based on a layout selected based on frames of the multiple video streams, as described in Block 454 and Block 460 below. Alternatively, the crop and scale parameter may be an aspect ratio (e.g., an aspect ratio of a display). In one or more embodiments, the frame is not modified. For example, a determination may be made that the frame is already consistent with the at least one crop and scale parameter.

The crop and scale parameter may be provided to a sending endpoint to crop and scale the frame prior to sending. For example, after selecting the layout, the receiver endpoint may transmit the crop and scale parameter to the sending endpoint. As another example, the receiving endpoint may apply the crop and scale parameter to a received frame. As another example, the server may determine the crop and scale parameter and apply the crop and scale parameter to the frame.

In Block 408, the modified frame is presented. For example, the video module of the receiving endpoint may present the modified frame by transmitting the modified frame to the display of the receiving endpoint. As another example, the video module of the receiving endpoint may transmit the modified frame to a software application that sends the modified frame to the display of the receiving endpoint.

As another example of presenting, the video module of the sending endpoint may transmit the modified frame to the video module of the receiving endpoint. For example, the video module of the receiving endpoint may request a frame with a specific crop and scale parameter. Continuing this example, the requested crop and scale parameter may be an aspect ratio or resolution of the display of the receiving endpoint. The sending endpoint may transmit a modified frame based on the requested crop and scale parameter to the video module of the receiving endpoint.

FIG. 4.2 shows a flowchart in accordance with one or more embodiments of the invention. The flowchart depicts a process for generating a video conference user interface layout. One or more of the steps in FIG. 4.2 may be performed by the components (e.g., the video module (40.1, 40.3) of a sending endpoint (10) and the video module (40.2, 40.4) of the receiving endpoint (60)) discussed above in reference to FIG. 3.1, FIG. 3.2, FIG. 3.3, and FIG. 3.4. In one or more embodiments of the invention, one or more of the steps shown in FIG. 4.2 may be omitted, repeated, and/or performed in parallel, or in a different order than the order shown in FIG. 4.2. Accordingly, the scope of the invention should not be considered limited to the specific arrangement of steps shown in FIG. 4.2. The steps of FIG. 4.2 may be performed by a server or receiving endpoint in one or more embodiments.

Initially, in Block 452, face detection information for frames is received by a receiving endpoint from sending endpoints (see description of Block 404 above).

In Block 454, a layout is selected by the receiving endpoint using the face detection information and the frames. The layout includes a frame size for each frame. The video module of the receiving endpoint may select, using the face detection information for the frames, the layout matching a layout rule. For example, a layout rule may assign a small frame size to a frame when the number of faces in the face detection information for the frame is below a threshold. As another example, a layout rule may assign a large frame size to a frame when the number of faces in the face detection information for the frame is at least the threshold.

The selected layout may be based on the number of frames and/or the number of faces included in the face detection information for the frames. For example, a layout rule may specify a "person-to-person layout" when each of the frames contains exactly one face, and the number of frames is 2. As another example, a layout rule may specify an "active speaker layout" when the number of frames is at least 3.

If, in Block 456 a determination is made that a portion of a display of the receiving endpoint is uncovered by the layout, then in Block 458 the frame size of a frame is expanded. For example, if a layout assigns each frame to be either a small frame size or a large frame size, then the frame size of a frame assigned the small frame size may be expanded to be the large frame size. The video module of the receiving endpoint may make the determination by arranging (e.g., tiling) the frames in a region whose size is equal to the size of the display of the receiving endpoint, and then checking whether any portion of the region is uncovered by a frame.

In Block 460, at least one crop and scale parameter for each frame is determined using the layout and the face detection information for the frames. For example, the at least one crop and scale parameter may be based on the frame size assigned to the frame and the number of faces detected in the frame. The at least one crop and scale parameter may include a target frame region enclosing the portion of the frame to be included in a modified frame generated from the frame. The at least one crop and scale parameter may further include a target face region enclosing the face of the frame. In one or more embodiments, the target frame region and the target face region are defined relative to a template that specifies the proportion of the of the target frame region occupied by the target face region. The template may further specify the relative positions of the target frame region and the target face region. For example, the video module of the receiving endpoint may use the template to scale the image contained in a frame by overlaying the template on the frame and then scaling the image until a face in the image fills the target face region. Continuing this example, after the face in the image fills the target face region, the video module of the receiving endpoint may crop out the portion of the scaled image external to the target frame region.

Figure 53:
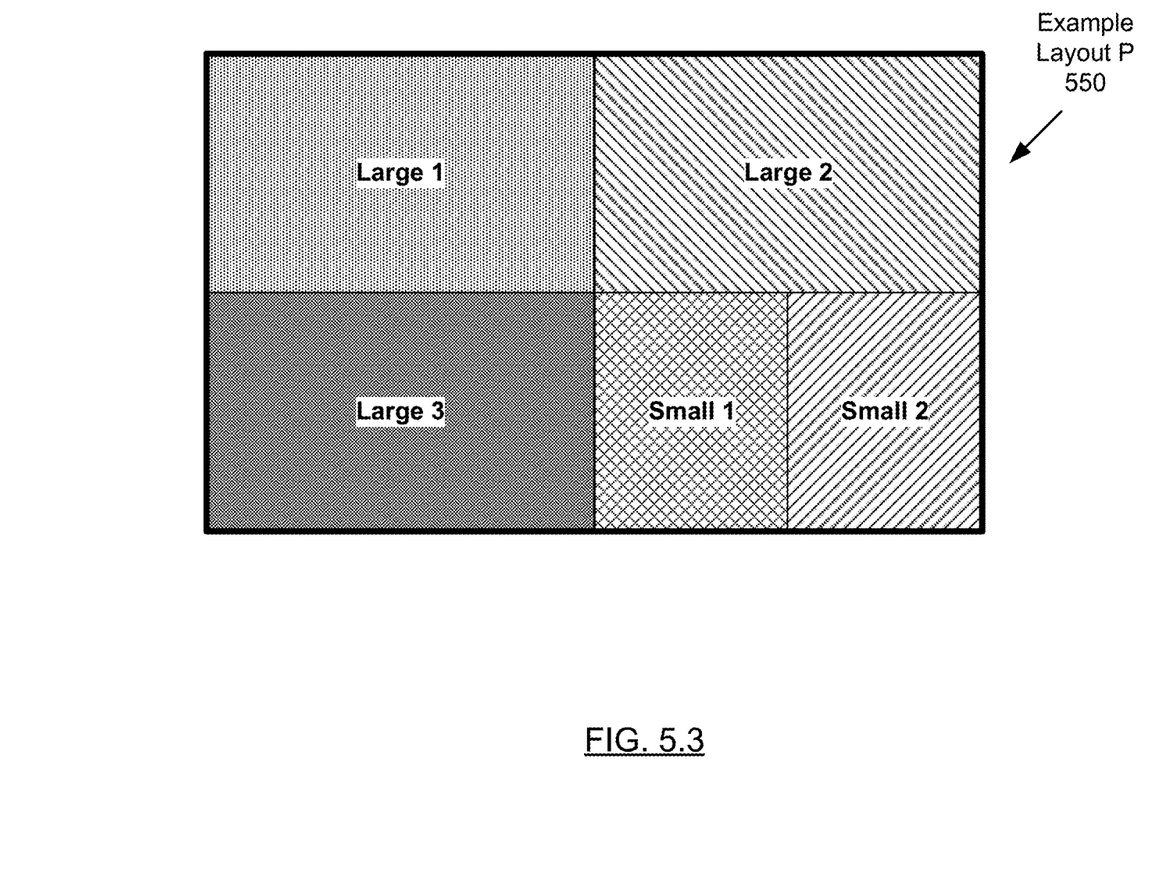
Figure 54:
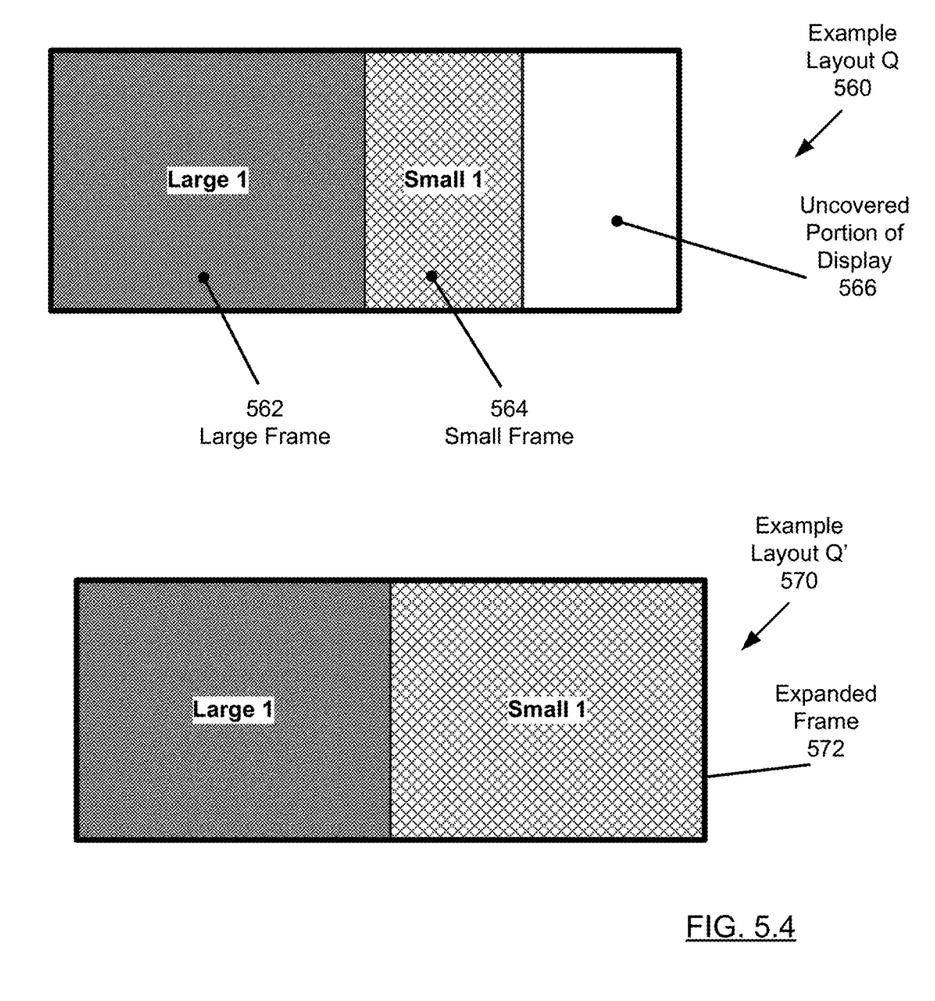

The video module of the receiving endpoint may then generate a modified frame for each frame using the at least one crop and scale parameter for the frame (see description of Block 406 above). The video module of the receiving endpoint may arrange the modified frames in the layout using the assigned frame sizes and then present the arranged frames in the layout to the display. FIG. 5.3 and FIG. 5.4 show examples of how frames of different frame sizes may be arranged in a layout.

For example, assume there are 2 frame sizes, where the large frame size is double the small frame size. In other words, the "frame sizing multiplier" is 2. A display coverage factor C may be calculated in terms of L, the number of large size frames, and S, the number of small size frames by the following formula:

$$C = L + |S/2|, \text{ where } |S/2| \text{ is the ceiling of } |S/2|.$$

When the display coverage factor C is not evenly divisible by the frame sizing multiplier, the layout may leave a portion of the display uncovered. Because in this example, the frame sizing multiplier is 2, when the display coverage factor C is an odd number, the layout may leave a portion of the display uncovered.

FIG. 5.1, FIG. 5.2, FIG. 5.3, and FIG. 5.4 show an implementation example(s) in accordance with one or more embodiments. The implementation example(s) are for explanatory purposes only and not intended to limit the scope of the invention. One skilled in the art will appreciate that implementation of embodiments of the invention may take various forms and still be within the scope of the invention.

FIG. 5.1 shows input video frames (502) ((302) in FIG. 3.1 and FIG. 3.3, (302.1, 302.2) in FIG. 3.2) received at a receiving endpoint from sending endpoints via a network. The receiving endpoint also receives, from the sending endpoints via the network, face detection information indicating that each of the input video frames (502) includes exactly one face. The receiving endpoint (e.g., the video module of the receiving endpoint) selects the conversational layout (506) ((380.1, 380.2) in FIG. 3.2 and FIG. 3.4) based on a layout rule indicating that the conversational layout (506) is used when each input frame includes one face and the number of input frames is 2.

The receiving endpoint generates modified frames (504) ((394.1, 394.2) in FIG. 3.2 and FIG. 3.4, (394) in FIG. 3.3) from the input video frames (502) using crop and scale parameters. The crop and scale parameters include a target frame region (508) ((396) in FIG. 3.2) and a target face region (510) ((398) in FIG. 3.2). The dashed rectangle and the dashed oval in FIG. 5.1 show an example template. The size of the oval specifies the scale and the size of the rectangle specifies the crop area. Thus, the template represents a crop and scale parameter in the example.

Continuing with FIG. 5.1, the receiving endpoint overlays the target frame region (508) and the target face region (510)

on both input video frames (502). The receiving endpoint scales the input video frames (502) until the faces in the input video frames (502) fill the target face region (510). After the faces in the input video frames (502) fill the target face region (510), the receiving endpoint crops out portions of the input video frames (502) external to the target frame region (508). The receiving endpoint then arranges the modified frames (504) in a conversational layout (506). The eyes in the faces of the modified frames (504) are on the same alignment level (512) because the same crop and scale parameters (i.e., the same target frame region (508) and target face region (510)) were used to crop and scale the input video frames (502).

Figure 52:
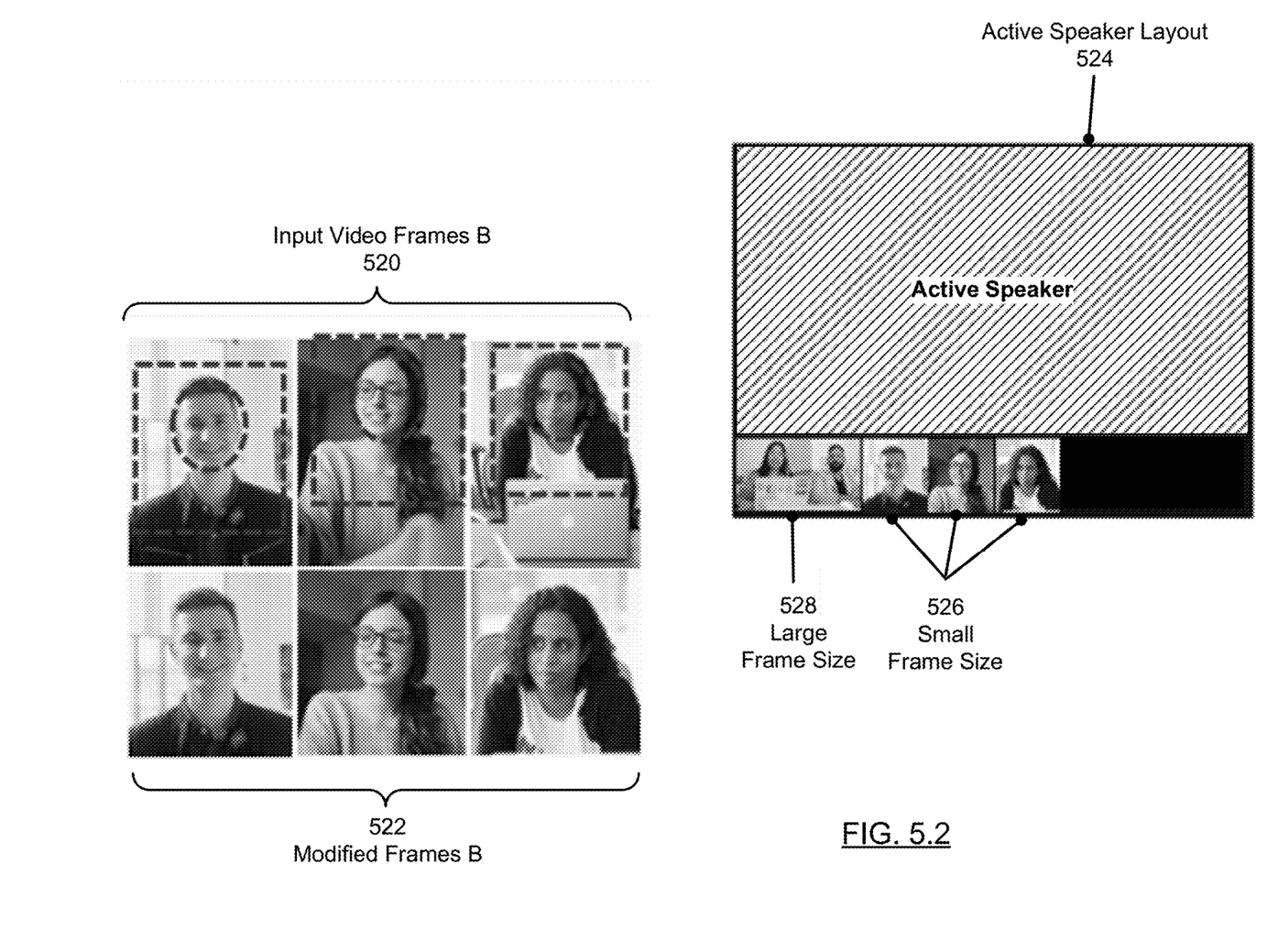

FIG. 5.2 shows input video frames (520) received at a receiving endpoint from sending endpoints via a network. The receiving endpoint also receives, from the sending endpoints via the network, face detection information indicating that each of the input video frames (520) includes exactly one face. FIG. 5.2 also shows the modified frames (522) generated from the input video frames (520). However, in contrast to FIG. 5.1, the receiving endpoint (e.g., the video module of the receiving endpoint) selects the active speaker layout (524) based on a layout rule indicating that the active speaker layout (524) is used when the number of input frames is at least 3. The layout rules corresponding to the active speaker layout (524) assign a small frame size (526) to the frames containing 1 face, and a large frame size (528) to a frame containing more than 1 face.

FIG. 5.3 shows an arrangement of large frames and small frames within example layout P (550). FIG. 5.4 shows an arrangement of 1 large frame (562) and 1 small frame (564) within example layout Q (560). Example layout Q (560) includes an uncovered portion of the display (566) because the width of the display is equal to twice the width of the large frame. FIG. 5.4 also shows example layout Q' (570) where the small frame (564) of example layout Q (560) has been modified by the receiving endpoint into an expanded frame (572) that is the same size as the large frame (562), thus fully covering the display.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A system comprising:
   a sending endpoint to:
   extract, when the sending endpoint receives a plurality of video streams, a video frame from one of the of video streams, and
   generate, from the video frame when the sending endpoint extracts the video frame, face detection information; and
   a receiving endpoint to:
   receive, from the sending endpoint, the face detection information for the video frame,
   receive, from another sending endpoint, additional face detection information for an additional video frame from another of the of video streams, and
   select, when the receiving endpoint processes the face detection information and the additional face detection information, a layout comprising a frame size for the video frame and a frame size for the additional video frame,
   wherein the face detection information identifies, in the video frame, a face size of a face and a face position of the face.

2. The system of claim 1, wherein the face detection information includes:
   a target face region that encloses the face in the video frame, and
   a target frame region that encloses the target face region.

3. The system of claim 1, wherein the sending endpoint is to:
   crop and scale, when the sending endpoint processes the face detection information, the face onto a modified frame.

4. The system of claim 1, wherein the receiving endpoint is to:
   determine, in the layout, a proportion of the video frame occupied by a region enclosing a face in the video frame.

5. The system of claim 1, wherein the receiving endpoint is to:
   determine, in the layout, a proportion of the additional video frame occupied by a region enclosing a face in the additional video frame.

6. The system of claim 1, wherein the receiving endpoint is to:
   determine, when the receiving endpoint selects the layout, whether or not a number of faces in the video frame is below a number of faces threshold.

7. The system of claim 6, wherein the receiving endpoint is to:
   assign, to the video frame when the receiving endpoint determines that the number of faces is below the number of faces threshold, a frame size that is smaller than a large frame size.

8. The system of claim 7, wherein the receiving endpoint is to:
   assign, to the video frame when the receiving endpoint determines that the number of faces is not below the number of faces threshold, the large frame size.

9. The system of claim 7, wherein the receiving endpoint is to:
   expand, when the receiving endpoint determines that a portion of a display of the receiving endpoint is uncovered by the layout, the frame size.

10. A method comprising:
    extracting, by a sending endpoint when the sending endpoint receives a plurality of video streams, a video frame from one of the of video streams;
    generating, by the sending endpoint from the video frame when the sending endpoint extracts the video frame, face detection information;
    receiving, by receiving endpoint from the sending endpoint, the face detection information for the video frame;

receiving, by receiving endpoint from another sending endpoint, additional face detection information for an additional video frame from another of the of video streams; and selecting, by receiving endpoint when the receiving endpoint processes the face detection information and the additional face detection information, a layout comprising a frame size for the video frame and a frame size for the additional video frame, wherein the face detection information identifies, in the video frame, a face size of a face and a face position of the face.

11. The method of claim 10, wherein the face detection information includes:

a target face region that encloses the face in the video frame, and a target frame region that encloses the target face region.

12. The method of claim 10, further comprising:

cropping and scaling, by the sending endpoint when the sending endpoint processes the face detection information, the face onto a modified frame.

13. The method of claim 10, further comprising:

determining, by receiving endpoint in the layout, a proportion of the video frame occupied by a region enclosing a face in the video frame, and determining, by receiving endpoint in the layout, a proportion of the additional video frame occupied by a region enclosing a face in the additional video frame.

14. The method of claim 10, further comprising:

determining, by receiving endpoint when the receiving endpoint selects the layout, whether or not a number of faces in the video frame is below a number of faces threshold.

15. The method of claim 14, further comprising:

assigning, to the video frame by receiving endpoint when the receiving endpoint determines that the number of faces is below the number of faces threshold, a frame size that is smaller than a large frame size.

16. The method of claim 15, further comprising:

assigning, to the video frame by receiving endpoint when the receiving endpoint determines that the number of faces is not below the number of faces threshold, the large frame size.

17. The method of claim 15, further comprising:

expanding, by receiving endpoint when the receiving endpoint determines that a portion of a display of the receiving endpoint is uncovered by the layout, the frame size.

18. A non-transitory computer readable medium comprising instructions that, when executed by a computer processor, perform the method of claim 10.

* * * * *